United States Patent
Brewer et al.

(10) Patent No.: US 8,557,001 B2
(45) Date of Patent: Oct. 15, 2013

(54) FUEL FORMULATIONS

(75) Inventors: Mark Lawrence Brewer, Chester (GB); Caroline Nicola Orlebar, Ince (GB); Richard John Price, Ince Chester (GB); Garo Garbis Vaporciyan, Houston, TX (US)

(73) Assignee: Shell Oil Company, Houston, TX (US)

(*) Notice: Subject to any disclaimer, the term of this patent is extended or adjusted under 35 U.S.C. 154(b) by 143 days.

(21) Appl. No.: 12/953,206

(22) Filed: Nov. 23, 2010

(65) Prior Publication Data

US 2011/0154727 A1  Jun. 30, 2011

(30) Foreign Application Priority Data

Nov. 24, 2009 (EP) .................................. 09176879

(51) Int. Cl.
*C10L 1/18* (2006.01)

(52) U.S. Cl.
USPC ............................................. 44/387; 44/388

(58) Field of Classification Search
USPC ................................................... 44/387, 388
See application file for complete search history.

(56) References Cited

U.S. PATENT DOCUMENTS

| | | | | |
|---|---|---|---|---|
| 2,332,386 A | | 10/1943 | Gaylor | 44/70 |
| 2,343,766 A | | 3/1944 | Gaylor | 44/71 |
| 4,364,743 A | * | 12/1982 | Erner | 44/388 |
| 4,891,049 A | | 1/1990 | Dillon et al. | 44/53 |
| 4,904,279 A | | 2/1990 | Kanne et al. | 44/70 |
| 5,004,480 A | | 4/1991 | Kanne | 44/387 |
| 5,425,790 A | | 6/1995 | Liotta, Jr. et al. | 44/443 |
| 6,387,138 B1 | * | 5/2002 | Murayama et al. | 44/387 |
| 6,652,608 B1 | | 11/2003 | Orr | 44/360 |
| 7,097,674 B2 | | 8/2006 | Delfort et al. | 44/349 |
| 2002/0134008 A1 | | 9/2002 | Waller et al. | 44/446 |
| 2004/0237384 A1 | | 12/2004 | Orr | |
| 2005/0091912 A1 | | 5/2005 | Schwab et al. | 44/300 |
| 2005/0210739 A1 | | 9/2005 | Esen et al. | 44/605 |
| 2007/0204506 A1 | | 9/2007 | Brenes | 44/389 |
| 2008/0092436 A1 | | 4/2008 | Seams et al. | 44/308 |
| 2010/0005707 A1 | | 1/2010 | Jacob | 44/385 |

FOREIGN PATENT DOCUMENTS

| | | |
|---|---|---|
| EP | 0082688 | 12/1982 |
| EP | 0277007 | 8/1988 |
| EP | 0474342 | 7/1991 |
| EP | 0728835 | 8/1996 |
| EP | 0905217 | 3/1999 |
| EP | 1531174 | 5/2005 |
| JP | 61207496 | 9/1986 |
| JP | 09040976 | 2/1997 |
| JP | 2006037075 | 2/2006 |
| WO | WO2008019325 | 2/2008 |
| WO | WO2008104929 | 9/2008 |
| WO | WO2008132917 | 11/2008 |
| WO | WO2008135801 | 11/2008 |

OTHER PUBLICATIONS

Knothe, Gerhard, "Evaluation of Ball and Disc Wear Sear Data in the HFRR Lubricity Test", Lubrication Science 2008, vol. 20, pp. 35-45.
Kenar, James A. et al., "Physical Properties of Oleochemical Carbonates", JAOCS Press, 2005, vol. 82, No. 3, pp. 201-205.
European Search Report, dated Jun. 16, 2010, Application No. 09176879.6.
European Search Report, dated Apr. 26, 2010, Application No. 09176875.4.
European Search Report, dated Mar. 17, 2010, Application No. 09176880.4.
European Search Report, dated Apr. 20, 2010, Application No. 09176885.3.

* cited by examiner

*Primary Examiner* — Cephia D Toomer

(57) ABSTRACT

Diesel fuel formulation is provided containing (i) FAME with ≤50% w/w saturates, (ii) dialkyl carbonate (DAC) and (iii) an additional diesel fuel component. Also provided is a diesel fuel supplement containing FAME and DAC, for use in a diesel fuel formulation.

17 Claims, No Drawings

FUEL FORMULATIONS

This application claims the benefit of European Application No. 09176879.6 filed Nov. 24, 2009 which is incorporated herein by reference.

FIELD OF THE INVENTION

This invention relates to diesel fuel formulations, their preparation and their use.

BACKGROUND TO THE INVENTION

In the interests of the environment, and to comply with increasingly stringent regulatory demands, it is necessary to increase the amount of biofuels used in automotive fuels.

Biofuels are combustible fuels, typically derived from biological sources, which result in a reduction in "well-to-wheels" (i.e. from source to combustion) greenhouse gas emissions. In diesel fuels for use in compression ignition engines, the most common biofuels are fatty acid methyl esters (FAMEs) such as rapeseed methyl ester and palm oil methyl ester; these are used in blends with conventional diesel fuel components. However, the oxidative degradation products of FAMEs tend to accumulate in engine oil, causing lubricity issues, which has limited their use to 10% v/v or less in modern FAME/diesel blends. At higher concentrations they can also cause fouling of fuel injectors. FAMEs are also more expensive to produce than other common biofuels such as ethanol, and their world production levels much lower.

Moreover, the addition of a FAME to a diesel fuel formulation can be detrimental to its low temperature performance. FAMEs raise the cloud points and the cold filter plugging points (CFPPs) of diesel fuels with which they are blended, to an extent which increases with increasing FAME concentration in the blend. This can make it difficult to formulate diesel fuel/FAME blends within the relevant regulatory specifications, particularly for colder climates where specifications require maximum cloud points and CFPPs to be lower than in more temperate regions. As a result, there are limits to the concentrations at which FAMEs can be included in diesel fuels, in particular winter grade fuels.

It would be desirable to provide new biofuel-containing diesel fuel formulations which could overcome or at least mitigate this problem.

SUMMARY OF THE INVENTION

According to an embodiment of the present invention there is provided a diesel fuel formulation comprising (i) one or more FAME components wherein the FAME component or mixture of FAME components has 50% w/w saturates, e.g. rapeseed methyl ester (RME) (ii) a dialkyl carbonate (DAC) and (iii) an additional diesel fuel component.

In another embodiment a diesel fuel supplement for use in a diesel fuel formulation is provided, the supplement comprising (i) at least one FAME component having 50% w/w saturates, and (ii) a DAC.

In yet another embodiment a method of preparing such formulation and a method of operating an internal combustion engine and/or a vehicle which is driven by an internal combustion engine comprising introducing into a combustion chamber of the engine such fuel formulation or a diesel fuel supplement is provided.

DETAILED DESCRIPTION OF THE INVENTION

It has been found that dialkyl carbonates such as diethyl carbonate (DEC) and dibutyl carbonate (DBC) can significantly lower the cold filter plugging point (CFPP) of an RME-containing diesel fuel formulation. The CFPP of a formulation according to the invention can not only be lower than that of the same formulation without the DAC, but also lower than that of an otherwise identical formulation containing only the DAC and no RME. Indeed, it has been found that in blends of RME, DEC or DBC and diesel fuels, the CFPP can decrease in value with increasing RME concentration, in contrast to the usual situation in which CFPP values increase at higher FAME concentrations. The effect is particularly surprising since it would be expected that because of the respective CFPPs of the RME, the DEC or DBC and typical diesel fuels, the properties of the FAME, not those of the dialkyl carbonate, would dominate the blend properties.

This apparent synergy between FAME and DAC, in a diesel fuel formulation, allows fuels to be formulated with higher FAME concentrations than might otherwise have been thought possible, whilst still meeting applicable standard specifications. It can also result in a diesel fuel containing a predetermined concentration of FAME being fit for purpose over a wider temperature range. Thus more optimised methods for formulating biofuel-containing diesel fuel formulations are provided, in particular winter grade diesel fuels, more particularly to achieve target CFPPs.

There can be other advantages to a fuel formulation which contains both a FAME and a dialkyl carbonate. The DAC will lower the cloud point of the formulation, relative to that of the components (i) and (iii) together and the DAC will have little effect on the flash point of FAME/basefuel blend. Although the DAC can also lower the flash points of diesel fuel formulations, in accordance with the present invention the FAME (eg RME) can help to compensate for any undesired decrease in flash point due to the presence of the DAC. Using a mixture of FAME and DAC thus allows higher overall levels of biofuels to be included in a diesel fuel formulation, without undue adverse effects on its cloud point, flash point and CFPP.

The DAC can moreover be used to replace a proportion of the FAME in a biofuel-containing diesel fuel formulation, thus allowing a potentially higher bioenergy content with fewer of the above described drawbacks associated with higher FAME concentrations.

DAC materials, and particularly DEC and DBC, also have low toxicity, are biodegradable, and can be produced from renewable ingredients (carbon dioxide and bio-alcohol).

The component (i) is a FAME component that has a level of saturation that is at most 50% w/w. The level (% w/w) of saturation of a FAME is the percentage of saturated fatty acid chains out of all (saturated and unsaturated) chains. The saturation level gives an indication of tendency of the liquid to crystalise. FAMEs with low levels of saturation have better cold flow properties than those with high levels. The level of saturation is measured by EN 14103 and can give an indication of the type of FAME present. A single FAME may be utilized having the appropriate saturation level, or a mixture of FAMEs, the total saturation level of which is at most 50% w/w, for example a FAME of higher than 50% w/w can be used in admixture with one of a sufficient lower saturation such that the total saturation level is 50% or below.

Examples of FAMEs that can be used are rapeseed methyl ester (RME), soybean methyl ester (SME), tall methyl ester (TallME), sunflower methyl ester (SunME) and Safflower methyl ester (SafME). Examples of mixtures of FAMEs that can be used are mixtures of one or more of palm olive methyl ester (POME), tallow methyl ester (TME), and coconut oil methyl ester (CME) with one or more of the above mentioned methyl esters.

Most suitably the level of saturation is less than 25% w/w, or less than 20% w/w, or less than 15% w/w, or preferably, less than 10% w/w.

The FAME is suitably a C1 to C5 alkyl ester, for example a methyl, ethyl, propyl, (eg isopropyl) or butyl ester. The most preferred FAME component (i) in a formulation of the invention is rapeseed methyl ester (RME).

The FAME used in an embodiment may be produced by any suitable method. In the case of RME this is, for example, by transesterification of rapeseed oil with methanol. This process, which is suitably either acid- or base-catalysed such as with the base KOH, converts the triglycerides contained in the oil into fatty acid esters and free glycerol, by separating the fatty acid components of the oil from their glycerol backbone. RME (which is also known as rape oil methyl ester or rape methyl ester) can also be prepared by standard esterification of appropriate fatty acids.

Rapeseed oil contains mixtures of palmitic acid (C16); stearic acid (C18); oleic, linoleic and linolenic acids (C18, with one, two and three unsaturated carbon-carbon bonds respectively); and sometimes also erucic acid (C22)—of these the oleic and linoleic acids form the major proportion. RME will thus contain mixtures of corresponding methyl esters.

The FAME suitably—although this is not essential—conforms to the European specification EN 14214 for fatty acid methyl esters for use as diesel fuels. It may have a flash point (IP 34) of greater than 101° C.; a measured cetane number (ASTM D613) of 55 or greater, or of 58 or 60 or 65 or even 70 or greater; a kinematic viscosity at 40° C. (IP 71 or EN ISO 3104) of from 1.9 to 6.0 centistokes, or from 3.5 to 5.0 centistokes; a density from 845 to 910 kg/m$^3$, or from 860 to 900 kg/m$^3$, at 15° C. (IP 365, EN ISO 12185 or EN ISO 3675); a water content (IP 386) of less than 500 ppm; a T95 (the temperature at which 95% of the fuel has evaporated, measured according to IP 123 or EN ISO 3405) of less than 360° C.; an acid number (IP 139) of less than 0.8 mgKOH/g, or of less than 0.5 mgKOH/g; and/or an iodine number (IP 84) of less than 125, or of less than 120 or less than 115, grams of iodine (I$_2$) per 100 g of fuel. It may also contain (eg by NMR) less than 0.2% w/w of free alcohol (for example methanol), less than 0.02% w/w of free glycerol and/or greater than 96.5% w/w esters.

The concentration of the FAME in a diesel fuel formulation may be 0.5% v/v or greater, or 1 or 2 or 3 or 4% v/v or greater, or in cases 4.5 or 5% v/v or greater. Its concentration may be up to 15% v/v, or up to 12 or 10 or 8 or 5% v/v. In an embodiment of the invention, its concentration may be from 2.5 to 14% v/v, or from 3 to 12% v/v, or from 5 to 10% v/v.

The dialkyl carbonate is suitably a di(C1 to C5) alkyl carbonate. Most suitably the dialkyl carbonate is dimethyl carbonate, diethyl carbonate, di- n- or iso-propyl carbonate, or di n-, iso- or tert-butylcarbonate. A mixture of dialkyl carbonates may be used. The carbonate used may also be asymmetric, where each alkyl moiety in the carbonate is different to the other, and indeed mixtures of asymmetric carbonates may be used as the component (ii).

The DAC used in a formulation according to the invention may also be obtained from any suitable source, of which many are available. It can for example be synthesised from alcohol, which may be bio-alcohol (i.e. alcohol derived from a biological source). It can also be prepared by oxidative carbonylation of alcohol, or by transesterification of dimethyl carbonate with alcohol. DEC, for example, may be synthesized from ethanol, which may be bio-ethanol (i.e. ethanol derived from a biological source). It can also be prepared by oxidative carbonylation of ethanol, or by transesterification of dimethyl carbonate with ethanol, or it may be generated as a co-product in the synthesis of monoethylene glycol from ethylene oxide and carbon dioxide via ethylene carbonate.

In an embodiment, it may be preferred for the DAC, for example DEC, not to have been synthesised using phosgene (COCl$_2$), as this may introduce undesirable impurities such as chlorides or carbonochloridic acid derivatives. Such impurities may contribute to deposit, stability and corrosion problems in a fuel formulation.

The concentration of the DAC, in a diesel fuel formulation according to the invention, may be 2.5 or 3 or 4% v/v or greater, or in cases 4.5% v/v or greater. In an embodiment, its concentration is 5% v/v or greater. Its concentration may be up to 15% v/v, or up to 12 or 10 or 8 or 5% v/v. In an embodiment, its concentration may be from 2.5 or 3 or 5 to 14% v/v, or from 3 or 5 to 12% v/v, or from 5 to 10% v/v.

Where the DAC is DEC, most suitably the concentration of DEC in the formulation of the invention is in the range of from 3 to 15% v/v. Where the DAC is DBC the concentration is most suitably in the range of from 5 to 15% v/v.

The volume ratio of the FAME to the DAC in the formulation may for instance be from 25:1 to 1:25, or from 10:1 to 1:10, or from 5:1 to 1:5, or from 2:1 to 1:2. It may be from 5:1 to 1:1, or from 2:1 to 1:1, or from 1.5:1 to 1:1. It may be 1:1 or approximately 1:1.

In an embodiment, the combined concentration of FAME and DAC in the formulation (which will typically represent the total oxygenate concentration in the formulation) is 4 or 5% v/v or greater, or 6 or 7% v/v or greater, or 8 or 9 or 10% v/v or greater. The combined concentration may be up to 30% v/v, or up to 28 or 25 or 24 or 22 or 20% v/v. It may for instance be from 4 or 5 to 28% v/v, or from 5 or 6 or 7 to 24% v/v, or from 7 or 8 to 22% v/v, or from 10 to 20% v/v, or from 5 to 20% v/v. For RME in combination with DEC, the combined concentration is suitably in the range of from 6 to 30% v/v; for RME in combination with DBC, it is suitably in the range of from 10 to 30% v/v.

The additional diesel fuel component (iii) may be any fuel component suitable for use in a diesel fuel formulation and therefore for combustion within a compression ignition (diesel) engine. It will typically be a liquid hydrocarbon middle distillate fuel, more typically a gas oil. It may be a kerosene fuel component. It may be petroleum derived. Alternatively it may be synthetic: for instance it may be the product of a Fischer-Tropsch condensation. It may be derived from a biological source. It may be or include an oxygenate such as an alcohol (in particular a C1 to C4 or C1 to C3 aliphatic alcohol, more particularly ethanol).

An additional fuel component (iii) will typically boil in the range from 150 or 180 to 360° C. (ASTM D86 or EN ISO 3405). It will suitably have a measured cetane number (ASTM D613) of from 40 to 70 or from 40 to 65 or from 51 to 65 or 70.

The formulation may contain a mixture of two or more additional diesel fuel components (iii).

The concentration of the component(s) (iii) in the formulation may suitably be 70% v/v or greater, or 75 or 80 or 85% v/v or greater, or 90 or 92 or 95% v/v or greater. It may be up to 98% v/v, or up to 95 or 92 or 90 or 85 or 80% v/v. In general, it will represent the major part of the fuel formulation. After inclusion of the FAME component (i), the DAC component (ii), and any optional fuel additives, the component (iii) will typically represent the balance to 100%.

A fuel formulation suitably has a CFPP (EN 116) of 5° C. or lower, or of 0° C. or lower, or of −5 or −10° C. or lower, or of −15° C. or lower, or of −18 or −20 or −25 or −30 or −35 or −40° C. or lower. It may have a cloud point (ASTM D5773) of 10° C. or lower, or of 5 or 2 or 0° C. or lower, or of −5 or −10° C. or lower, or of −12 or −15 or −20 or −25 or −30° C. or lower. It may have a flash point (ASTM D92 or D93) of 35° C. or greater, or of 40 or 50 or 55° C. or greater, or in cases of 60 or even 65° C. or greater.

The formulation should be suitable for use in a compression ignition (diesel) internal combustion engine. Such an engine may be either heavy or light duty. The formulation may in particular be suitable for use as an automotive diesel fuel.

In an embodiment, the formulation is suitable and/or adapted for use as a "winter grade" automotive diesel fuel, for use in colder climates such as in northern Europe (particularly Scandinavia) or North America. It may be a so-called "arctic grade" fuel, for use in particularly extreme climates such as in northern Scandinavia.

In further embodiments, the formulation may be suitable and/or adapted for use as an industrial gas oil, or as a domestic heating oil.

The formulation will suitably comply with applicable current standard diesel fuel specification(s) such as for example EN 590 (for Europe) or ASTM D975 (for the USA). By way of example, the overall formulation may have a density from 820 to 845 kg/m$^3$ at 15° C. (ASTM D4052 or EN ISO 3675); a T95 boiling point (ASTM D86 or EN ISO 3405) of 360° C. or less; a measured cetane number (ASTM D613) of 51 or greater; a kinematic viscosity at 40° C. (ASTM D445 or EN ISO 3104) from 2 to 4.5 centistokes; a sulphur content (ASTM D2622 or EN ISO 20846) of 50 mg/kg or less; and/or a polycyclic aromatic hydrocarbons (PAH) content (IP 391 (mod)) of less than 11% w/w. Relevant specifications may however differ from country to country and from year to year, and may depend on the intended use of the formulation. Moreover a formulation according to the invention may contain fuel components with properties outside of these ranges, since the properties of an overall blend may differ, often significantly, from those of its individual constituents.

The relative concentrations of the components (i) to (iii) may be chosen to achieve desired properties for the formulation as a whole, for example a desired maximum cloud point and/or a desired minimum flash point, and/or in particular a desired maximum CFPP. Thus the relative concentrations will also depend on the physicochemical properties of the individual components. Appropriate concentrations may be calculated by applying suitable blending rules to the properties (for example the densities or viscosities) of the individual components, and may be visualised using a three-way composition plot.

The fuel formulation may contain standard fuel or refinery additives which are suitable for use in diesel fuels. Many such additives are known and commercially available.

A diesel fuel supplement is provided for use in a diesel fuel formulation, the supplement containing (i) a FAME, such as RME, and (ii) a DAC, such as DEC or DBC. Thus, for example RME may be premixed with DEC and then added to one or more diesel fuel components, such as a component (iii) of the type described above, in order to prepare a diesel fuel formulation.

There is also provided a process for the preparation of a diesel fuel formulation, which process involves blending together (i) one or more FAME components wherein the FAME component or mixture of FAME components has ≤50% saturates, (ii) a DAC and (iii) one or more additional diesel fuel components, optionally with one or more fuel additives. The process may be used to produce at least 1,000 liters of the fuel formulation, or at least 5,000 or 10,000 or 25,000 liters, or at least 50,000 or 75,000 or 100,000 liters.

In an embodiment, the FAME and DAC are premixed in an appropriate volume ratio, and the mixture then blended with the additional fuel component(s) (iii). The FAME/DAC mixture may for instance be blended with the component(s) (iii) at a concentration of up to 50% v/v based on the product fuel formulation, or at a concentration of up to 40 or 35 or 30 or 28 or 25 or 22 or 20% v/v, or of up to 15 or 10% v/v. It may be blended at a concentration of 1% v/v or greater based on the product formulation, or of 2 or 3 or 4 or 5% v/v or greater, or in cases of 6 or 7 or 8 or 9 or 10% v/v or greater. Adding the DAC to the FAME can, by reducing its CFPP and cloud point, help to improve its low temperature handling and storage properties.

A method of operating an internal combustion engine, and/or a vehicle which is driven by an internal combustion engine, is provided comprising introducing into a combustion chamber of the engine a diesel fuel formulation described above or a diesel fuel supplement described above. The engine is suitably a compression ignition (diesel) engine. Such a diesel engine may be of the direct injection type, for example of the rotary pump, in-line pump, unit pump, electronic unit injector or common rail type, or of the indirect injection type. It may be a heavy or a light duty diesel engine.

Yet in another embodiment a DAC, such as DEC or DBC, is introduced into a reservoir which contains an a FAME-containing diesel fuel formulation, eg an RME-containing diesel fuel formulation, prior to introduction of the resultant mixture into a combustion chamber of the engine. It also embraces introducing a FAME into a reservoir which contains a DAC-containing diesel fuel formulation, prior to introduction of the resultant mixture into a combustion chamber of the engine. In other words, the diesel fuel formulation of the invention may be prepared in situ in a reservoir from which fuel is fed into an internal combustion engine.

In another embodiment, there is provided the use of a DAC, in a diesel fuel formulation containing a FAME, for the purpose of reducing the CFPP of the formulation. A sixth aspect provides the use of a FAME, in a diesel fuel formulation containing a DAC, for the purpose of reducing the CFPP of the formulation.

A combination of a FAME and a DAC can be used in a diesel fuel formulation, for the purpose of reducing the CFPP of the formulation.

Thus, in accordance with the invention, a FAME and a DAC can act together in a diesel fuel formulation to improve its low temperature properties and/or its low temperature performance in an internal combustion engine.

The diesel fuel formulation may contain one or more additional diesel fuel components in addition to the FAME and the DAC. It may in particular be a winter grade diesel fuel formulation. The relevant use may for instance be for the purpose of reducing the CFPP of the formulation to −10° C. or below, or to −15° C. or below, or to −20° C. or below, or to −25 or −30° C. or below.

The CFPP of a fuel formulation is the highest temperature at which a given volume of the formulation fails to pass through a standardised filtration device in a specified time, when cooled under standardised conditions. It can be assessed using a standard test method such as EN 116 or IP 309 or an analogous technique. The principle behind such tests is that a sample of the test formulation is cooled under specified conditions and is drawn into a pipette under a controlled vacuum through a standardised wire mesh filter. The procedure is repeated, as the fuel continues to cool, for each 1° C. below the first test temperature. Testing is continued until the amount of wax crystals which have separated out of the formulation is sufficient to stop or slow down the flow, so that the time taken to fill the pipette exceeds 60 seconds or the fuel fails to return completely to its source before it has cooled by a further 1° C.

The present invention may be used to achieve any degree of reduction in the CFPP of the fuel formulation, and/or for the purpose of achieving a CFPP at or below a desired target value.

By way of example, the invention may be used to reduce the CFPP of the formulation by at least 0.3% of its value (expressed in Kelvin) prior to addition of the DAC and/or the FAME, or by at least 0.5 or 0.8%, or by at least 1 or 1.5% or in cases even by 2 or 5 or 8% or more.

DAC may be introduced in a diesel fuel formulation containing a FAME in an effective amount to reduce the concentration of a cold flow additive in the formulation. FAME may be introduced in a diesel fuel formulation containing a DAC in an effective amount to reduce the concentration of a cold flow additive in the formulation. A combination of FAME and a DAC may be introduced in a diesel fuel formulation in an effective amount to reduce the concentration of a cold flow additive in the formulation.

In the context of the eighth to the tenth aspects of the invention, the term "reducing" embraces any degree of reduction, including reduction to zero. The reduction may for instance be 10% or more of the original cold flow additive concentration, or 25 or 50 or 75 or 90% or more. The reduction may be as compared to the concentration of cold flow additive which would otherwise have been incorporated into the fuel formulation in order to achieve the properties and performance required and/or desired of it in the context of its intended use. This may for instance be the concentration of cold flow additive which was present in the formulation prior to the realisation that a DAC and/or a FAME could be used in the way provided by the present invention, and/or which was present in an otherwise analogous fuel formulation intended (e.g. marketed) for use in an analogous context, prior to adding a DAC and/or a FAME to it in accordance with the invention.

The reduction in cold flow additive concentration may be as compared to the concentration of cold flow additive which would be predicted to be necessary to achieve a desired target CFPP for the formulation in the absence of the DAC and/or the FAME.

The cold flow additive may be any additive which is able to, or intended to, improve the cold flow performance of the fuel formulation, in particular by lowering its CFPP. Many such additives are known; they include for example middle distillate flow improvers (MDFIs) and wax anti-settling additives (WASAs) such as ethylene vinyl acetate, poly-olefin esters, polyamides and olefin ester copolymers. Such additives are conventionally included in diesel fuel formulations so as to improve their performance at lower temperatures, and thus to improve the low temperature operability of systems (typically vehicles) running on the formulations.

In the context of the present invention, "use" of a DAC and/or a FAME in a diesel fuel formulation means incorporating the DAC and/or a FAME into the formulation, typically as a blend (ie a physical mixture) with one or more other diesel fuel components. The DAC and/or FAME will conveniently be incorporated before the formulation is introduced into an engine or other system which is to be run on the formulation. Instead or in addition the use of a DAC and/or RME may involve running a fuel-consuming system, typically an internal combustion engine, on a diesel fuel formulation containing the DAC and/or FAME, typically by introducing the formulation into a combustion chamber of an engine.

In the present context, "achieving" a desired target property also embraces—and in an embodiment involves—improving on the relevant target. Thus a DAC and/or FAME may be used to produce a fuel formulation which has a CFPP below a desired target value, or which exhibits a better cold flow performance than a desired target.

Throughout the description and claims of this specification, the words "comprise" and "contain" and variations of the words, for example "comprising" and "comprises", mean "including but not limited to", and do not exclude other moieties, additives, components, integers or steps. Moreover the singular encompasses the plural unless the context otherwise requires: in particular, where the indefinite article is used, the specification is to be understood as contemplating plurality as well as singularity, unless the context requires otherwise.

Preferred features of each aspect of the invention may be as described in connection with any of the other aspects. Other features of the invention will become apparent from the following examples. Generally speaking the invention extends to any novel one, or any novel combination, of the features disclosed in this specification (including any accompanying claims and drawings). Thus features, integers, characteristics, compounds, chemical moieties or groups described in conjunction with a particular aspect, embodiment or example of the invention are to be understood to be applicable to any other aspect, embodiment or example described herein unless incompatible therewith. Moreover unless stated otherwise, any feature disclosed herein may be replaced by an alternative feature serving the same or a similar purpose.

The present invention will now be further described with reference to the following non-limiting example.

Example 1

Diesel fuel formulations according to the invention were prepared by blending various concentrations of rapeseed methyl ester (RME) and diethyl carbonate (DEC) with a diesel base fuel DBF.

The base fuel (DBF) was a commercially available Swedish Class I diesel base fuel, ex. Shell, formulated for use in colder climates and containing a relatively high concentration of aromatic hydrocarbons. It had a CFPP (IP 309) of −37° C. and a cloud point (ASTM D5773) of −36° C. It had a density at 15° C. (ASTM D4052) of 813.7 kg/m$^3$, an initial boiling point (ASTM D86) of 181° C., a T95 boiling point (ASTM D86) of 286° C., a final boiling point (ASTM D86) of 294° C., a measured cetane number (ASTM D613) of 56.3 and a kinematic viscosity at 40° C. (ASTM D445) of 1.96 mm$^2$/s.

The RME was sourced from ADM and the DEC from Sigma Aldrich, UK. The RME properties are summarised in Table 1 below.

TABLE 1

| Property | Test method | RME |
|---|---|---|
| Ester content(% w/w) | EN 14103 | 99 |
| Density @ 15° C. (kg/m$^3$) | IP 365 | 883.3 |
| Viscosity @ 40° C. (mm$^2$/s) | IP 71 | 4.463 |
| Flash point (° C.) | IP 34 | 170 |
| Water content (mg/kg) | UK 3367 | 215 |
| Total contamination (particulates) (mg/kg) | IP 440 | 1.6 |
| Oxidation stability (Rancimat ™), 110° C. (hours) | EN 14112 | 8.9 |
| Acid value (mg KOH/g) | IP 139 | 0.16 |
| Iodine value (g/100 g) | IP 84 EN 14111 | 117 |

TABLE 1-continued

| Property | Test method | RME |
|---|---|---|
| Linolenic acid methyl ester (C18:3) (% w/w) | EN 14103 | 9.82 |
| Methanol content (% w/w) | CEN 14106 | <0.01 |
| Monoglyceride content (% w/w) | CEN 14105 | 0.76 |
| Diglyceride content (% w/w) | CEN 14105 | 0.13 |
| Triglyceride content (% w/w) | CEN 14105 | <0.01 |
| Level of saturation (% w/w) | EN 14103 | 8.0 |

The CFPPs of the prepared formulations, and of the RME, DEC and base fuel, were measured using the standard test method IP 309. The results are shown in Table 2 below.

TABLE 2

| DEC concentration (% v/v) | RME concentration (% v/v) | CFPP (° C.) |
|---|---|---|
| 0 | 0 | −37 |
| 2.5 | 2.5 | −36 |
| 5 | 0 | −37 |
| 0 | 5 | −35 |
| 5 | 5 | −39 |
| 10 | 0 | −38 |
| 0 | 10 | −20 |
| 10 | 10 | −41 |
| 0 | 15 | −20 |
| 15 | 15 | −21 |
| 0 | 25 | −21 |
| 25 | 25 | −21 |
| 100 | 0 | <−63 |
| 0 | 100 | −5 |

It can be seen from Table 2 that the CFPPs of base fuel/RME blends generally increase with increasing RME concentration. For this base fuel, and in respect of CFPP, the effect of the DEC addition diminishes above 10% v/v; it is believed that for other formulations, and in respect of other properties, such amounts are still useful. However, generally it is found that at any given RME concentration the addition of an equal volume of DEC lowers the CFPP of the blend.

Surprisingly, the use of a 1:1 v/v blend of DEC and RME in the base fuel can give CFPP values even lower than those which result from blending the base fuel with DEC alone at the same concentration as in the 1:1 blend. Bearing in mind the high CFPP of RME alone compared to DEC, it would have been expected that such an RME/DEC/base fuel blend would have a higher CFPP, at any given DEC concentration, than a binary DEC/base fuel blend. In other words, it would have been expected that the FAME would dominate the CFPP characteristics of the RME/DEC/base fuel blend, as indeed it has been shown to do for cloud points. For reference, the cloud points (ASTM D5773) of the prepared formulations, or in cases of freshly prepared blends containing the same concentrations of DEC, RME and DBF, are shown in Table 3 below.

TABLE 3

| DEC concentration (% v/v) | RME concentration (% v/v) | Cloud point (° C.) |
|---|---|---|
| 0 | 0 | −36 |
| 2.5 | 2.5 | −35 |
| 5 | 0 | −37 |
| 0 | 5 | −33 |

TABLE 3-continued

| DEC concentration (% v/v) | RME concentration (% v/v) | Cloud point (° C.) |
|---|---|---|
| 5 | 5 | −34 |
| 10 | 0 | −37 |
| 0 | 10 | −31 |
| 10 | 10 | −33 |
| 100 | 0 | <−63 |
| 0 | 100 | −5 |

The surprising CFPP results in Table 2 suggest that there may be a synergistic interaction between the DEC and the RME in the base fuel. The effect seems to be particularly great at DEC and RME concentrations from about 2.5 to 10% v/v, ie at total oxygenate concentrations from about 5 to 20% v/v.

The same effect is not observed for all FAMEs. Although DEC has been found to reduce the CFPPs of FAME/DBF blends containing either palm oil methyl ester (POME) or tallow methyl ester (TME), the CFPPs of the ternary DEC/FAME/DBF blends in each case are still significantly higher than those for the corresponding binary DEC/DBF blends.

As a result of this surprising discovery, the present invention allows the formulation of a diesel fuel which contains a reasonable concentration of biofuel components, and yet which has a better CFPP than would have been possible by incorporating either DEC alone or RME alone at the same or even a lower concentration. Using the DEC and the RME together in a diesel fuel formulation makes it easier to tailor the formulation to fit with relevant standards or to meet desired specification targets, in particular for winter grade fuels which face more stringent CFPP specifications than summer grade fuels.

For example, the Table 2 RME/DEC/base fuel formulations containing from 5 to 20% v/v total oxygenate (RME+DEC) would all comply with winter grade fuel specifications in a wide range of countries, as regards their CFPP and cloud point values. The maximum specified winter grade CFPPs and cloud points for a number of geographical regions are shown in Table 4 below.

TABLE 4

| Region | Max cloud point (° C.) | Max CFPP (° C.) |
|---|---|---|
| Norway (arctic) | −22 | −32 |
| Norway (non-arctic) | −15 | −24 |
| Sweden | −16 | −26 |
| Finland | −16 | −26 |
| Denmark | None | −20 |
| Canada (Toronto) | −20 | None |
| Canada (Western) | −34 to −37 | None |

Example 2

Diesel fuel formulations according to the invention were prepared by blending various concentrations of rapeseed methyl ester (RME2) and diethyl carbonate (DEC) with a diesel base fuel DBF2.

The base fuel was a commercially available Swedish Class I diesel base fuel, ex. Shell, formulated for use in colder climates and containing a relatively high concentration of aromatic hydrocarbons. It had a CFPP (IP 309) of −34° C. and a cloud point (ASTM D5773) of −36° C. It had a density at 15° C. (ASTM D4052) of 814 kg/m$^3$, an initial boiling point (ASTM D86) of 181° C., a T95 boiling point (ASTM D86) of 285° C., a final boiling point (ASTM D86) of 296° C., a measured cetane number (ASTM D613) of 52.5 and a kinematic viscosity at 40° C. (ASTM D445) of 1.86 mm²/s.

The RME was sourced from ADM and the DEC from Sigma Aldrich, UK. The RME properties are summarised in Table 5 below.

TABLE 5

| Property | Test method | RME2 |
|---|---|---|
| Ester content (% w/w) | EN 14103 | 99 |
| Density @ 15° C. (kg/m³) | IP 365 | 883.4 |
| Viscosity @ 40° C. (mm²/s) | IP 71 | 4.466 |
| Flash point (° C.) | IP 34 | 165.5 |
| Water content (mg/kg) | UK 3367 | 210 |
| Total contamination (particulates) (mg/kg) | IP 440 | 3.4 |
| Oxidation stability (Rancimat ™), 110° C. (hours) | EN 14112 | 7.0 |
| Acid value (mg KOH/g) | IP 139 | 0.22 |
| Iodine value (g/100 g) | IP 84 | 112 |
|  | EN 14111 |  |
| Linolenic acid methyl ester (C18:3) (% w/w) | EN 14103 | 9.8 |
| Methanol content (% w/w) | CEN 14106 | <0.01 |
| Monoglyceride content (% w/w) | CEN 14105 | 0.44 |
| Diglyceride content (% w/w) | CEN 14105 | 0.09 |
| Triglyceride content (% w/w) | CEN 14105 | 0.02 |
| Level of saturation (%w/w) | EN 14103 | 6.88 |

The CFPPs of the prepared formulations, and of the RME2, DEC and base fuel (DBF2), were measured using the standard test method IP 309. The results are shown in Table 6 below.

TABLE 6

| DEC concentration (% v/v) | RME2 concentration (% v/v) | CFPP (° C.) |
|---|---|---|
| 0 | 0 | −34 |
| 2.5 | 0 | −34.5 |
| 0 | 2.5 | −32.5 |
| 2.5 | 2.5 | −32.5 |
| 3 | 0 | −35 |
| 0 | 3 | −32.5 |
| 3 | 3 | −35 |
| 5 | 0 | −34.5 |
| 0 | 5 | −30 |
| 5 | 5 | −38 |
| 10 | 0 | −35 |
| 0 | 10 | −23.5 |
| 10 | 10 | −38 |
| 5 | 10 | −40 |
| 10 | 5 | −35 |
| 12 | 0 | −35 |
| 0 | 12 | −21.5 |
| 12 | 12 | −39 |
| 15 | 0 | −36.5 |
| 0 | 15 | −19.5 |
| 15 | 15 | −40 |

It can be seen from Table 6 that the CFPPs of base fuel/RME blends generally increase with increasing RME concentration. Here the positive effect of DEC addition on CFPP extends to concentrations of 15% v/v. Again at any given RME concentration the addition of an equal volume of DEC lowers the CFPP of the blend.

Surprisingly, the use of a 1:1 v/v blend of DEC and RME2 in the base fuel can give CFPP values even lower than those which result from blending the base fuel with DEC alone at the same concentration as in the 1:1 blend or a 2:1 blend or a 1:2 blend. Bearing in mind the high CFPP of RME2 alone compared to DEC, it would have been expected that such an RME2/DEC/base fuel blend (DBF2) would have a higher CFPP, at any given DEC concentration, than a binary DEC/base fuel blend. In other words, it would have been expected that the FAME would dominate the CFPP characteristics of the RME/DEC/base fuel blend, as indeed it has been shown to do for cloud points. For reference, the cloud points (ASTM D5773) of the prepared formulations, or in cases of freshly prepared blends containing the same concentrations of DEC, RME2 and DBF2, are shown in Table 7 below.

TABLE 7

| DEC concentration (% v/v) | RME2 concentration (% v/v) | Cloud point (° C.) |
|---|---|---|
| 0 | 0 | −36 |
| 2.5 | 0 | −37 |
| 0 | 2.5 | −34 |
| 2.5 | 2.5 | −34 |
| 3 | 0 | −36 |
| 0 | 3 | −33 |
| 3 | 3 | −33 |
| 5 | 0 | −37 |
| 0 | 5 | −30 |
| 5 | 5 | −33 |
| 10 | 0 | −37 |
| 0 | 10 | −30 |
| 10 | 10 | −32 |
| 5 | 10 | −32 |
| 10 | 5 | −34 |
| 12 | 0 | −37 |
| 0 | 12 | −30 |
| 12 | 12 | −32 |
| 15 | 0 | −37 |
| 0 | 15 | −28 |
| 15 | 15 | −31 |

The surprising CFPP results in Table 6 suggest that there may be a synergistic interaction between the DBC and RME in the base fuel. The effect seems to be particularly great at DEC and RME concentrations from 3 to 15% v/v, ie at total oxygenate concentrations from about 6 to 30% v/v. The DEC has more of an impact, the higher the total level of oxygenate. With respect to the CP results in Table 7, the presence of more than 5% v/v DEC reduces the CP of a FAME/diesel blend compared to the equivalent volume of FAME on its own in diesel.

Example 3

Diesel fuel formulations according to the invention were prepared by blending various concentrations of rapeseed methyl ester (RME2) from Example 2 and dibutyl carbonate (DBC) with a diesel base fuel DBF2 from Example 2.

The CFPPs of the prepared formulations, and of the RME2, DBC and base fuel (DBF2), were measured using the standard test method IP 309. The results are shown in Table 8 below.

TABLE 8

| DBC concentration (% v/v) | RME2 concentration (% v/v) | CFPP (° C.) |
|---|---|---|
| 0 | 0 | −34 |
| 2.5 | 0 | −34.5 |
| 0 | 2.5 | −32.5 |
| 2.5 | 2.5 | −32.5 |

TABLE 8-continued

| DBC concentration (% v/v) | RME2 concentration (% v/v) | CFPP (° C.) |
|---|---|---|
| 3 | 0 | −35 |
| 0 | 3 | −32.5 |
| 3 | 3 | −32.5 |
| 5 | 0 | −35 |
| 0 | 5 | −30 |
| 5 | 5 | −34 |
| 10 | 0 | −35 |
| 0 | 10 | −23.5 |
| 10 | 10 | −41 |
| 12 | 0 | −35.5 |
| 0 | 12 | −21.5 |
| 12 | 12 | −41 |
| 15 | 0 | −35.5 |
| 0 | 15 | −19.5 |
| 15 | 15 | −39 |

For reference, the cloud points (ASTM D5773) of the prepared formulations, or in cases of freshly prepared blends containing the same concentrations of DBC, RME2 and DBF2, are shown in Table 9 below.

TABLE 9

| DBC concentration (% v/v) | RME2 concentration (% v/v) | CP (° C.) |
|---|---|---|
| 0 | 0 | −36 |
| 2.5 | 0 | −36 |
| 0 | 2.5 | −37 |
| 2.5 | 2.5 | −34 |
| 3 | 0 | −37 |
| 0 | 3 | −33 |
| 3 | 3 | −34 |
| 5 | 0 | −37 |
| 0 | 5 | −30 |
| 5 | 5 | −33 |
| 10 | 0 | −36 |
| 0 | 10 | −30 |
| 10 | 10 | −32 |
| 12 | 0 | −37 |
| 0 | 12 | −30 |
| 12 | 12 | −31 |
| 15 | 0 | −37 |
| 0 | 15 | −28 |
| 15 | 15 | −30 |

The surprising CFPP results in Table 8 suggest that there may be a synergistic interaction between the DBC and RME2 in the base fuel. The effect seems to be particularly great at DBC and RME2 concentrations from 5 to 15% v/v, ie at total oxygenate concentrations from about 10 to 30% v/v. The DEC has more of an impact, the higher the total level of oxygenate. With respect to the CP results in Table 9, the presence of more than 3% v/v DBC reduces the CP of a FAME/diesel blend compared to the equivalent volume of FAME on its own in diesel.

What is claimed is:

1. A diesel fuel formulation comprising (i) a diesel fuel component comprising one or more fatty acid methyl ester (FAME) components wherein the FAME component or the mixture of FAME components has ≤50% w/w saturates, (ii) a dialkyl carbonate (DAC) and (iii) an additional diesel fuel component, wherein the concentration of (i) and (ii) is in a range from 4 to 50% v/v.

2. The fuel formulation of claim 1 wherein the concentration of component (i) is in the range of from 3.0 to 15% v/v.

3. The fuel formulation of claim 1 wherein component (i) is rapeseed methyl ester (RME).

4. The fuel formulation of claim 1 wherein the DAC is diethyl carbonate (DEC) in a concentration in the range of from 3.0 to 15% v/v.

5. The fuel formulation of claim 4 wherein component (i) is rapeseed methyl ester (RME).

6. The fuel formulation of claim 5 wherein the combined concentration of the RME and the DEC is in the range of from 6 to 30% v/v.

7. The fuel formulation of claim 5 wherein the volume ratio of the RME to the DEC is in the range of from 2:1 to 1:2.

8. The fuel formulation of claim 7 wherein the volume ratio of the RME to the DEC is 1:1.

9. The fuel formulation of claim 1 wherein the DAC is dibutyl carbonate (DBC) in a concentration in the range of from 5.0 to 15% v/v.

10. The fuel formulation of claim 9 wherein component (i) is rapeseed method ester (RME) and the combined concentration of the RME and the DBC is in the range of from 10 to 30% v/v.

11. The fuel formulation of claim 10 wherein the volume ratio of the RME to the DBC is 1:1.

12. The fuel formulation of claim 1 which has a cold filter plugging point (CFPP) as measured by EN 116, of −10° C. or lower.

13. A diesel fuel supplement for use in a diesel fuel formulation, the supplement comprising (i) at least one FAME component having ≤50% w/w saturates, and (ii) a DAC, wherein the concentration of (i) and (ii) is in a range from 4 to 50% v/v.

14. The diesel fuel supplement of claim 13 comprising (i) RME and (ii) DEC, or (i) RME and (ii) DBC.

15. A process for the preparation of a diesel fuel formulation comprising blending together (i) a diesel fuel component comprising one or more FAME components wherein the FAME component or mixture of FAME components has ≤50% w/w saturates, (ii) a DAC and (iii) one or more additional diesel fuel components, wherein the concentration of (i) and (ii) is in a range of 4 to 50% v/v.

16. A method of operating an internal combustion engine, and/or a vehicle which is driven by an internal combustion engine comprising introducing into a combustion chamber of the engine a diesel fuel formulation of claim 1.

17. A method of operating an internal combustion engine, and/or a vehicle which is driven by an internal combustion engine comprising introducing into a combustion chamber of the engine a diesel fuel supplement of claim 13.

* * * * *